US007376963B2

(12) United States Patent
Kato et al.

(10) Patent No.: US 7,376,963 B2
(45) Date of Patent: May 20, 2008

(54) BROADCASTING SYSTEM, BROADCASTING APPARATUS, BROADCASTING METHOD AND RECEIVING APPARATUS

(75) Inventors: Taku Kato, Fuchu (JP); Koji Okada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1068 days.

(21) Appl. No.: 10/386,566

(22) Filed: Mar. 13, 2003

(65) Prior Publication Data

US 2004/0005860 A1 Jan. 8, 2004

(30) Foreign Application Priority Data

Mar. 18, 2002 (JP) ............................ 2002-074980

(51) Int. Cl.
*H04N 7/16* (2006.01)

(52) U.S. Cl. .......................................... 725/28; 725/25

(58) Field of Classification Search .................... None
See application file for complete search history.

(56) References Cited

U.S. PATENT DOCUMENTS

2002/0120930 A1* 8/2002 Yona .......................... 725/34
2002/0162118 A1* 10/2002 Levy et al. ................. 725/110
2003/0192060 A1* 10/2003 Levy .......................... 725/133

FOREIGN PATENT DOCUMENTS

JP 10-164550 6/1998
JP 2002-77799 3/2002
JP 2002-335464 11/2002

* cited by examiner

*Primary Examiner*—Christopher Grant
*Assistant Examiner*—Omar Parra
(74) *Attorney, Agent, or Firm*—Oblon, Spivak, McClelland, Maier & Neustadt, P.C.

(57) ABSTRACT

In each embodiment of this invention, when the precondition information of a broadcast program is cut on the viewer side, the use of the broadcast program is limited. A broadcasting system includes a broadcasting apparatus which sequentially transmits first broadcast data containing first control information and second broadcast data containing second control information over the same channel, and a receiving apparatus which executes, upon sequentially loading of the first and second broadcast data, processing based on the first control information and second control information on the basis of an input command. With this arrangement, when first or second broadcast data is precondition information and the precondition information of a broadcast program is cut on the viewer side, since first or second control information is omitted, the use of the broadcast program can be limited.

14 Claims, 4 Drawing Sheets

BROADCASTING SYSTEM, BROADCASTING APPARATUS, BROADCASTING METHOD AND RECEIVING APPARATUS

CROSS-REFERENCE TO RELATED APPLICATIONS

This application is based upon and claims the benefit of priority from the prior Japanese Patent Application No. 2002-74980, filed on Mar. 18, 2002, the entire contents of which are incorporated herein by reference.

BACKGROUND OF THE INVENTION

The present invention relates to a broadcasting system, broadcasting apparatus, broadcasting method, and receiving apparatus which are used for digital broadcasting and, more particularly, to a broadcasting system, broadcasting apparatus, broadcasting method, and receiving apparatus which can limit the use of a broadcast program when precondition information in the broadcast program is cut on the viewer side.

In general, a broadcasting station such as a terrestrial broadcasting station transmits a broadcast program that is viewable for free and inserts a pre-provided commercial midway along the broadcast program to obtain a program production cost or the like from a commercial provider which provides the commercial. More specifically, the broadcast program is transmitted for free by the broadcasting station in cooperation with the commercial provider. Note that an important precondition for free broadcasting is to viewing the broadcast program with a commercial.

In other words, a commercial cut phenomenon, i.e., viewing a broadcast program while cutting commercials, will break the above important precondition. Note that commercial cut phenomenon includes, for example, a case wherein a viewer switches to another channel during a commercial break and a case wherein a viewer records/plays back a program on a video recorder while cutting commercials by using the commercial cut function incorporated in the recorder.

The commercial cut phenomenon based on viewer's own operation at the time of viewing requires cumbersome operation on the viewer side, and hence may pose no serious problem.

A shift from analog broadcasting to digital broadcasting, however, will technically facilitate distinguishing broadcast programs and commercials and cutting the commercials. The commercial cut function will proliferate on devices on the viewer side at a high possibility.

Hard disk recorders for recording digital broadcasts have commercial cut functions and are expected to come in wide use in the future.

The commercial cut function of such a device will break the important precondition for free broadcasting, i.e., that commercials are viewed. It therefore should be preferable for the broadcasting station side or commercial provider side to inhibit such a commercial cut function.

Likewise, a prize contest program is known, in which a quiz that can be answered by any viewer who has viewed a broadcast program is offered at the end of the program, and the answer is used as an entry requirement for a prize.

It is an important precondition for such a type of prize content program that viewers of the program enter the prize contest. From the viewpoint of encouraging viewers to enter the prize content, it is undesirable to offer a difficult quiz. For this reason, some contestants make answers by viewing only a portion associated with a quiz entry without viewing the main program, or a given viewer can enter a prize contest by hearing an answer from another viewer without viewing the program by himself/herself.

In both the commercial cut function and prize contest program case, it is possible for a viewer, regardless of whether he/she has viewed the broadcast main program, to gain the same profit as that gained when he/she has viewed the main program. However, it may be preferable for the broadcasting side to prevent such a thing.

BRIEF SUMMARY OF THE INVENTION

It is an object of the present invention to provide a broadcasting system, broadcasting apparatus, broadcasting method, and receiving apparatus which can limit the use of a broadcast program when the precondition information of the broadcast program is cut on the viewer side.

According to the first aspect of the present invention, there is provided a broadcasting system comprising a broadcasting apparatus which sequentially transmits first broadcast data containing first control information and second broadcast data containing second control information over the same channel, and a receiving apparatus which executes, upon sequentially loading of the first and second broadcast data, processing based on the first control information and second control information on the basis of an input command.

With this arrangement, when the first or second broadcast data is precondition information and the precondition information of a broadcast program is cut on the viewer side, since the first or second control information is omitted, the use of the broadcast program can be limited.

Note that the first invention exemplifies the case wherein the invention is expressed as a "system". However, the present invention is not limited to this, and may be expressed as an overall or individual "apparatus", a "method" for the overall apparatus or each apparatus, or a "program" for each apparatus.

DETAILED DESCRIPTION OF THE INVENTION

Each embodiment of the present invention will be described below with reference to the several views of the accompanying drawing. An outline of each embodiment to be described below is that commercial data (or indispensable viewing data) containing control information is transmitted, so that when a viewer cuts the commercial data, the control information is cut, and the use of the broadcast program is limited.

Each embodiment is comprised of a broadcasting station which broadcasts, for example, a scrambled broadcast program, and a receiving device which has acquired a license with a predetermined obligation in advance and holds first secret information. In this case, it is preferable to provide a service form in which only the receiving device can obtain second secret information or the like required to descramble the broadcast program.

In addition, pieces of control information 1 and 2 may be embedded as digital watermarks in a video or audio signal of a commercial or broadcast program, or may be inserted in a blanking period. Alternatively, such information may be inserted in various data synchronized with broadcast program data, such as a control program sent as auxiliary information for a program.

If a broadcast program is scrambled, each embodiment may take a form in which information necessary for a descrambling operation is inserted in a commercial. Alternatively, each embodiment may take a form in which only a person who has viewed a commercial is permitted to record a program in such a manner that special playback features such as "pause", "rewind", and "fast-forward" can be effected.

FIRST EMBODIMENT

Figure 1:
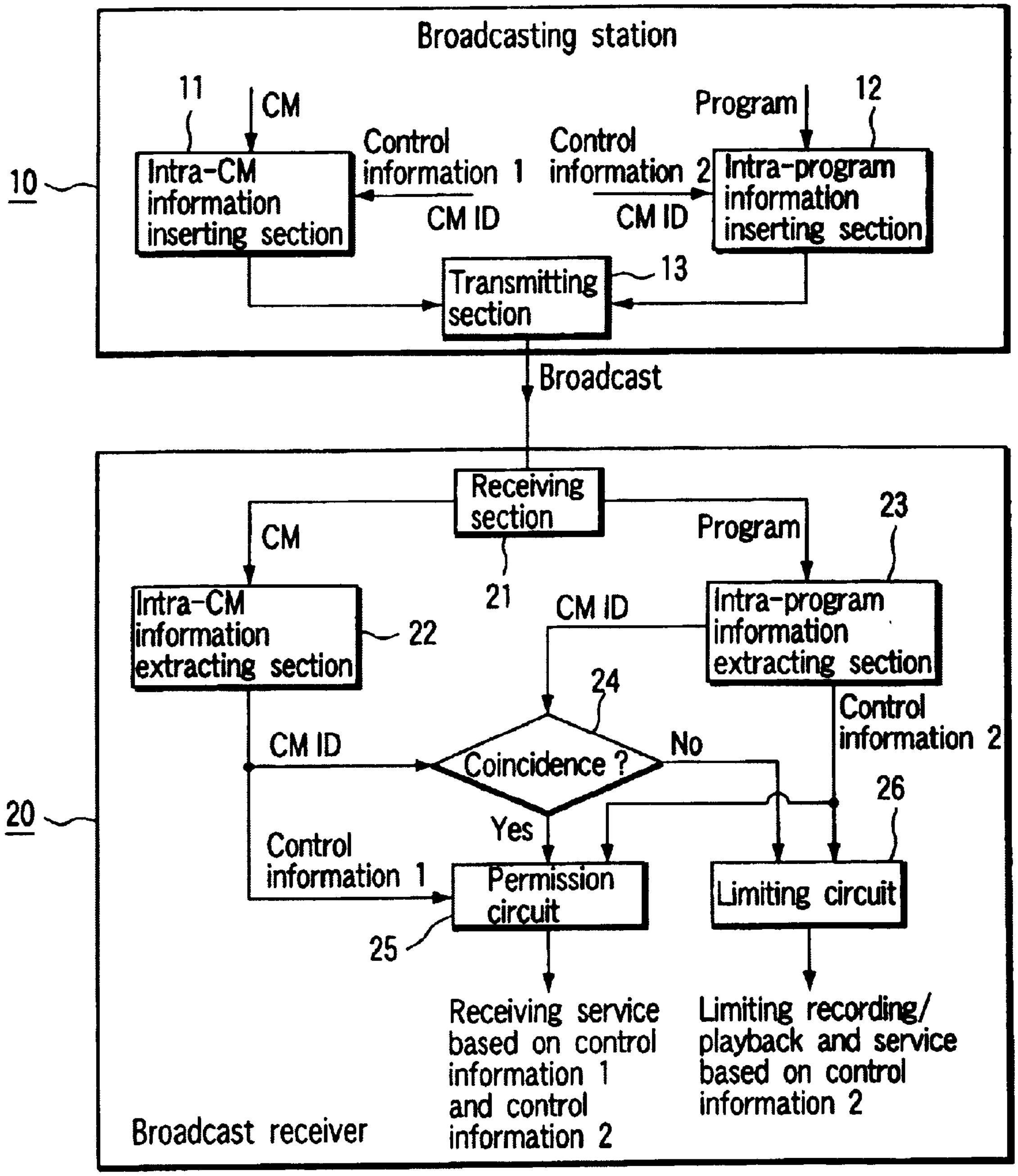
FIG. 1 is a schematic view showing the arrangement of a broadcasting system according to the first embodiment of the present invention.

FIG. 1 is a schematic view showing the arrangement of a broadcasting system according to the first embodiment of the present invention. This broadcasting system is comprised of a broadcasting station 10 which broadcasts broadcast programs and commercials, and a broadcast receiver 20 which receives the broadcast programs and commercials broadcast from the broadcasting station 10.

In this case, the broadcasting station 10 includes an intra-CM information inserting section 11, intra-program information inserting section 12, and transmitting section 13. Note that the broadcasting station 10 can be implemented by a hardware arrangement or a composite arrangement of hardware and software. The constituent part based on software is implemented by installing in advance programs from, for example, a storage medium or network into a computer in the broadcasting station 10.

The intra-CM information inserting section 11 has the following functions (11/1) to (11/3):

(11/1) the function of assigning a CM ID (CM identification number) to input commercial data (to be referred to as CM data hereinafter);

(11/2) the function of inserting the assigned CM ID into CM data, and also inserting control information 1 corresponding to the CM ID into the CM data; and (11/3) the function of sending out the CM data obtained by the insertion of the above information to the transmitting section 13.

In this case, when only recording of a program with CM cutting is to be prevented, the same CM ID may be assigned to CMs consecutively inserted in the program. When different control operations are to be done for specific CMs, different CM IDs may be assigned to them.

As the control information 1, for example, program recording control information, playback control information after recording, participation right control information in the case of a viewer participation program, or the like can be used. If control information is permanently determined in advance, a similar effect can be obtained without inserting the control information 1. As a method of inserting a CM ID or control information, for example, a method of inserting it in a blanking period of a video or a method of embedding it as a digital watermark in a video or audio signal can be used. This also applies to the intra-program information inserting section 12, described next.

The intra-program information inserting section 12 has the following functions (12/1) and (12/2):

(12/1) the function of inserting the CM ID assigned by the intra-CM information inserting section 11 into input program data, and also inserting control information 2 corresponding to this program data into the program data; and (12/2) the function of sending out, to the transmitting section 13, program data in which the CM ID and control information 2 are inserted.

In this case, the control information 2 contains information used for program viewing/recording control while no CM is received and the like in addition to the same kind of information of the control information 1. As in the case of the control information 1, if control information is permanently determined in advance, a similar effect can be obtained without inserting the control information 2.

The transmitting section 13 has a function of transmitting, to the broadcast receiver 20, the CM data sent out from the intra-CM information inserting section 11 and the program data sent out from the intra-program information inserting section 12.

The broadcast receiver 20 includes a receiving section 21, intra-CM information extracting section 22, intra-program information extracting section 23, coincidence determining section 24, permission circuit 25, and limiting circuit 26. Note that the broadcast receiver 20 can be implemented by a hardware arrangement or a composite arrangement of hardware and software. The constituent part based on software is implemented by installing in advance programs from, for example, a storage medium or network into a computer in the broadcast receiver 20. Of the sections of the broadcast receiver 20, for example, the sections 22 to 26 except for the receiving section can be implemented by software arrangements.

The receiving section 21 has the following functions (21/1) to (21/3):

(21/1) the function of receiving the CM data and program data transmitted from the broadcasting station 10;

(21/2) the function of sending out the CM data to the intra-CM information extracting section 22; and (21/3) the function of sending out the program data to the intra-program information extracting section 23.

The intra-CM information extracting section 22 has a function of extracting the CM ID and control information 1 from the CM data sent out from the receiving section 21 and holding them. Note that a scheme of extracting such information is prepared in accordance with the insertion scheme used on the broadcasting station 10 side. If, for example, information is inserted as a digital watermark on the broadcasting station 10 side, a digital watermark extraction scheme is prepared. This also applies to the intra-program information extracting section 23 to be described next.

The intra-program information extracting section 23 has a function of extracting the CM ID and control information 2 from the program data received from the receiving section 21 and holding them while sending out the CM ID to the coincidence determining section 24.

The coincidence determining section 24 has the following functions (24/1) to (24/3):

(24/1) the function of comparing the CM ID received from the intra-program information extracting section 23 with the CM ID held in the intra-CM information extracting section 22 and checking whether they coincide with each other;

(24/2) the function of sending out a determination output signal to the limiting circuit 26 when the determination result indicates that they do not coincide with each other or the intra-CM information extracting section 22 holds no CM ID; and (24/3) the function of sending out a determination output signal to the permission circuit 25 when the determination result indicates that they coincide with each other.

The permission circuit 25 has a function of permitting, upon reception of the determination output signal from the coincidence determining section 24, various recording/playback control operations, various services, and the like set for the respective program data on the basis of the control information 1 and control information 2 held in the respective extracting sections 22 and 23.

The limiting circuit 26 has a function of imposing, upon reception of the determination output signal from the coincidence determining section 24, limitations on recording/playback of the digital broadcast and services on the basis of the control information 2 held in the intra-program information extracting section 23.

The operation of the broadcasting system having the above arrangement will be described next.

In the broadcasting station 10, program data and commercial data (to be referred to as CM data hereinafter) to be broadcast in the program are prepared. The CM data is input to the intra-CM information inserting section 11. The program data is input to the intra-program information inserting section 12.

Upon reception of the CM data, the intra-CM information inserting section 11 assigns a CM ID to each peace of CM data. Subsequently, the intra-CM information inserting section 11 inserts each CM ID in the CM data and also inserts the control information 1 corresponding to the CM ID in the CM data. The intra-CM information inserting section 11 then sends out the CM data containing the CM ID and control information 1 to the transmitting section 13.

Likewise, upon reception of the program data, the intra-program information inserting section 12 inserts the CM ID in the program data and also inserts the control information 2 corresponding to the program data in the program data. The intra-program information inserting section 12 then sends out the program data containing the CM ID and control information 2 to the transmitting section 13.

The transmitting section 13 transmits this CM data and program data to the broadcast receiver 20.

In the broadcast receiver 20, the CM data received by the receiving section 21 is sent to the intra-CM information extracting section 22, and the program data received by the receiving section 21 is sent out to the intra-program information extracting section 23.

The intra-CM information extracting section 22 extracts the CM ID and control information 1 from the CM data and holds it. Note that if a program is received first without any CM, the flow of processing skips the processing in the intra-CM information extracting section 22 and advances to the processing in the intra-program information extracting section 23.

The intra-program information extracting section 23 extracts the CM ID and control information 2 from the program data received from the receiving section 21 and holds the control information 2. At the same time, the intra-program information extracting section 23 sends out the CM ID to the coincidence determining section 24.

The coincidence determining section 24 compares this CM ID with the CM ID held in the intra-CM information extracting section 22 to check whether they coincide with each other. If this determination result indicates that they do not coincide with each other, or when the intra-CM information extracting section 22 hold no CM ID, the coincidence determining section 24 sends out a determination output signal to the limiting circuit 26.

Upon reception of the determination output signal, the limiting circuit 26 imposes limitations on recording/playback of the digital broadcast and services on the basis of the control information 2 held in the intra-program information extracting section 23.

Various limitations can be imposed, according to program, e.g., "inhibiting recording" and "allowing no participation qualification in case of viewer participation program".

If the determination result indicates that the CM IDs coincide with each other, the coincidence determining section 24 sends out a determination output signal to the permission circuit 25.

Upon reception of the determination output signal, the permission circuit 25 permits various recording/playback control operations, various services, and the like set for the respective program data on the basis of the control information 1 and control information 2 held in the respective extraction circuits 22 and 23. This allows the viewer to enjoy various recording/playback control operations, various services, and the like.

In the case of a viewer participation program, sending participation right information as part of the control information 1 allows the viewer to enjoy a service of participation in the program.

As described above, according to this embodiment, embedding pertinent information (CM ID), control information 1, and control information 2 in commercials and program data provided by the commercials can effectively restrain the viewer from cutting the commercials.

If, for example, CM data in a broadcast program is cut on the viewer side, since the control information 1 is omitted, the use of the broadcast program can be limited.

In addition, viewing, recording, and special playback features of a broadcast program or permission/prohibition of participation in a program can be controlled according to the intention of the program provider, on the basis of viewing history information such as ID information embedded in a commercial or program in a specific period.

SECOND EMBODIMENT

Figure 2:
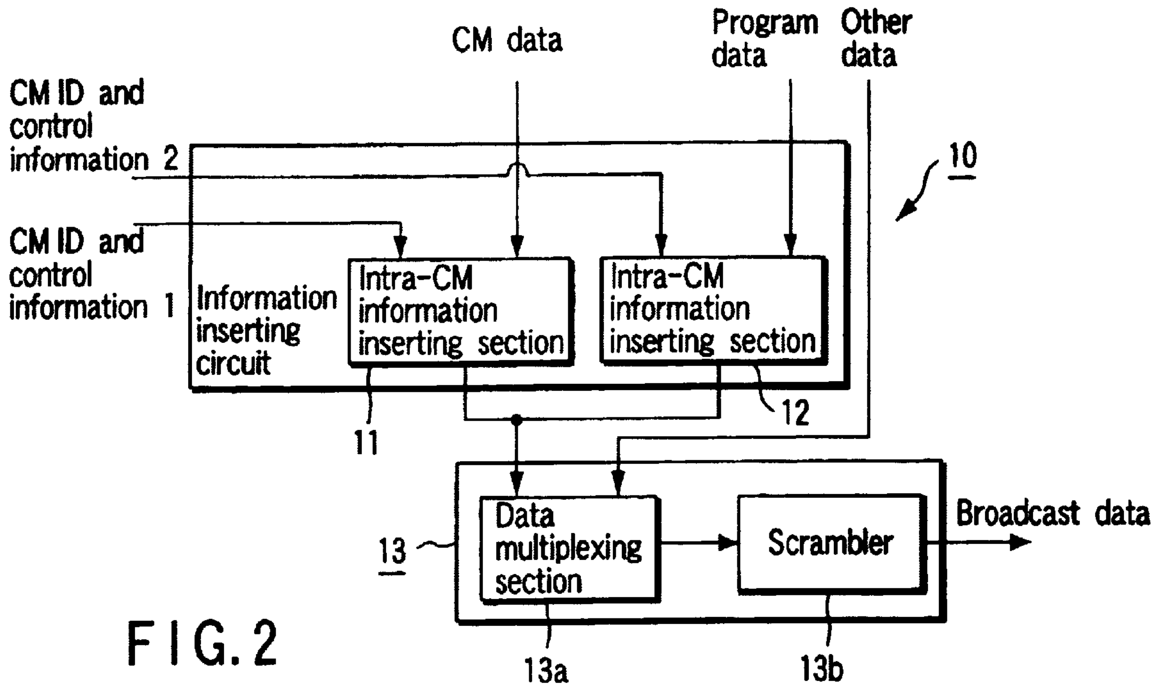
FIG. 2 is a schematic view showing the arrangement of a broadcasting station applied to a broadcasting system according to the second embodiment.
Figure 3:
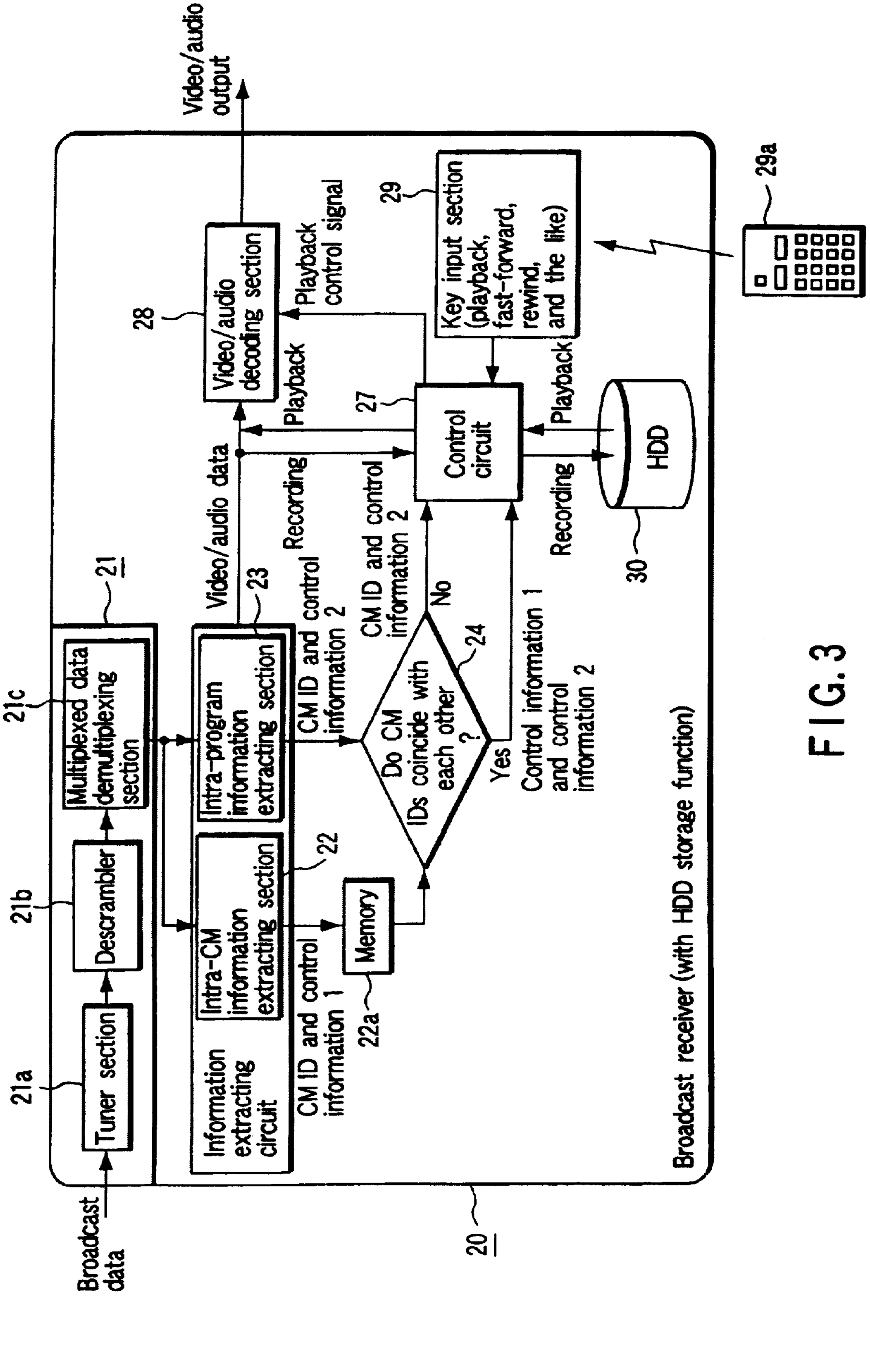
FIG. 3 is a schematic view showing the arrangement of a broadcast receiver in the second embodiment.

FIG. 2 is a schematic view showing the arrangement of a broadcasting station which is applied to a broadcasting system according to the second embodiment of the present invention. FIG. 3 is a schematic view showing the arrangement of a broadcast receiver applied to the system. The same reference numerals as in FIG. 1 denote the same parts in FIG. 3, and a detailed description thereof will be omitted. The differences between the first and second embodiments will be mainly described below. Likewise, a repetitive description will be avoided in the subsequent embodiment.

This embodiment is a concrete example of the first embodiment. The arrangements of a broadcasting station 10 and broadcast receiver 20 will be described in detail below.

In this case, in the broadcasting station 10, the transmitting section 13 of the above arrangement includes a data multiplexing section 13*a* and scrambler 13*b*.

The data multiplexing section 13*a* has a function of multiplexing the CM data and program data, which have undergone insertion processing and have been received from information inserting sections 11 and 12 identical to that described above, with other data such as program data and character broadcast data, and sending out the resultant multiplexed data to the scrambler 13*b*.

The scrambler 13*b* has a function of scrambling the multiplexed data received from the data multiplexing section 13*a* and transmitting the resultant broadcast data.

In the broadcast receiver 20, the receiving section 21 of the above arrangement includes a tuner section 21*a*, descrambler 21*b*, and multiplexed data demultiplexing section 21*c*. The broadcast receiver 20 includes a memory 22*a*, control circuit 27, video/audio decoding section 28, key input section 29, separate remote controller 29*a*, and hard disk (HDD) 30.

In this case, the tuner section 21*a* has a function of performing, upon reception of the broadcast data transmitted from the broadcasting station 10 through an antenna (not shown), broadcast data selection, demodulation, and error correction processing, and sending out a signal in a packet form to the descrambler 21*b*.

The descrambler 21*b* has a function of descrambling the signal in the packet form received from the tuner section 21*a* and sending out the resultant multiplexed data to the multiplexed data demultiplexing section 21*c*.

The multiplexed data demultiplexing section 21*c* has the following functions (21*cf*1) to (21*cf*4):

(21*cf*1) the function of demultiplexing the multiplexed data received from the descrambler 21*b* into CM data, program data, and other data;

(21*cf*2) the function of sending out the CM data to the intra-CM information extracting section 22;

(21*cf*3) the function of sending out the program data to the intra-program information extracting section 23; and (21*cf*4) the function of sending out other data to a processing section (not shown).

The memory 22*a* holds the CM ID and control information 1 extracted by the intra-CM information extracting section 22 so as to allow the coincidence determining section 24 to read out them.

The control circuit 27 has the same functions as those of the permission circuit 25 and limiting circuit 26 described above. More specifically, the control circuit 27 has a function of executing, upon reception of a determination output signal "coincidence (Yes)" from the coincidence determining section 24 and control signals 1 and 2, various recording/playback control operations, various services, and the like set for the respective program data.

In this case, the functions performed based on the pieces of control information 1 and 2 include the following functions (27*f*1) to (27*f*3):

(27*f*1) the function of recording, in the hard disk 30 in accordance with a recording command from the key input section 29, the CM data and the video/audio data contained in the program data which are obtained from the respective information extracting sections 22 and 23;

(27*f*2) the function of inputting the video/audio data recorded in the hard disk 30 to the video/audio decoding section 28 in accordance with a playback command from the key input section 29; and (27*f*3) the function of inputting a playback control signal for fast-forward/rewind control to the video/audio decoding section 28 in accordance with a fast-forward/rewind command from the key input section 29.

The functions performed based on the pieces of control information 1 and 2 include "imposing no limitation on recording/playback function", "giving permission to execute special mode", and the like.

The control circuit 27 has a function of imposing, upon reception of a determination output signal "incoincidence (No)" and the control information 2from the coincidence determining section 24, limitations on the processing that can be executed upon reception of "coincidence". Various limitations can be imposed, according to program, including "inhibiting recording", "inhibiting use of special mode in recording/playback operation", and the like.

Note that a limitation at the time of playback can be implemented by, for example, recording one control information 2on the hard disk 30, together with a video/audio signal, and making the control circuit 27 interpret it at the time of playback.

Likewise, playback without limitation may be implemented by recording the two pieces of control information 1 and 2 on the hard disk 30, together with a video/audio signal, and making the control circuit 27 interpret them at the time of playback, or may be implemented by imposing no limitation on playback in advance.

The video/audio decoding section 28 decodes the CM data and the video/audio data contained in the program data which are obtained from the respective extracting circuits 22 and 23, and performs a video/audio output operation.

The key input section 29 has the following functions (29*f*1) and (29*f*2) based on key input operation of the main body of the key input section 29 or operation of the separate remote controller 29*a*:

(29*f*1) the function of inputting a channel selection command, volume control command, and the like for a general television apparatus to the tuner section 21*a*; and (29*f*2) the function of inputting a recording command, playback command, fast-forward command, rewind command, or the like associated with recording/playback of broadcast contents to the control circuit 27.

The hard disk 30 stores a video/audio signal and the control information 2(and control information 1) so as to allow the control circuit 27 to read/write them, and is incorporated in the broadcast receiver 20 in this case. However, the hard disk 30 may be externally connected to the broadcast receiver 20 instead of being built-in.

The operation of the broadcasting system having the above arrangement will be described next.

As described above, in the broadcasting station 10, the respective information inserting sections 11 and 12 send out, to the transmitting section 13, CM data in which a CM ID and the control information 1 are inserted and program data in which the CM ID and the control information 2 are inserted.

In the transmitting section 13, the data multiplexing section 13*a* multiplexes the CM data, the program data, and other data such as computer program data or character broadcast data, and sends out the resultant multiplexed data to the scrambler 13*b*.

The scrambler 13*b* scrambles the multiplexed data and transmits the resultant broadcast data.

In the receiving section 21 of the broadcast receiver 20, the tuner section 21*a* receives the broadcast data and sends out the signal in the packet form which is obtained after selection/demodulation and the like to the descrambler 21*b*. The descrambler 21*b* descrambles the CM data, program data, and other data contained in this signal and sends out the resultant data to the multiplexed data demultiplexing section 21*c*.

The multiplexed data demultiplexing section 21c demultiplexes the data into CM data, program data, computer program data, character broadcast data, and the like. The multiplexed data demultiplexing section 21c then sends out the CM data to the intra-CM information extracting section 22, the program data to the intra-program information extracting section 23, and other data to a corresponding processing section (not shown).

As described above, the intra-CM information extracting section 22 extracts the CM ID and control information 1 from this CM data, and writes the CM ID and control information 1 in the memory 22a. The intra-CM information extracting section 22 also sends out the video/audio data of the CM data to the video/audio decoding section 28.

The intra-program information extracting section 23 extracts the CM ID and control information 2from the program data received from the receiving section 21, and sends out the CM ID and control information 2 to the coincidence determining section 24. The intra-program information extracting section 23 also sends out the video/audio data of the program data to the video/audio decoding section 28.

The video/audio decoding section 28 decodes the video/audio data sent out from the respective information extracting sections 22 and 23, and performs a video/audio output operation.

The coincidence determining section 24 compares the CM ID of the CM ID and control information 2from the intra-program information extracting section 23 with the CM ID in the memory 22a and checks whether they coincide with each other.

If the determination result indicates that they do not coincide with each other or no CM ID is held in the memory 22a, the coincidence determining section 24 sends out a determination output signal "incoincidence" and the control information 2to the control circuit 27. If the determination result indicates that they coincide with each other, the coincidence determining section 24 sends out a determination output signal "coincidence" and the control information 1 and control information 2to the control circuit 27.

Upon reception of the determination output signal "coincidence" and the control information 1 and control information 2, the control circuit 27 allows execution of various recording/playback control operations, various services, and the like set for the respective program data. Upon reception of the determination output signal "incoincidence" and the control information 2, the control circuit 27 imposes limitations on the processing that can be executed upon reception of "coincidence".

In this state, the key input section 29 inputs a recording command, playback command, fast-forward command, rewind command, or the like associated with recording/playback of broadcast contents to the control circuit 27 on the basis of key input operation of the main body of the key input section 29 or operation of the separate remote controller 29a.

Upon reception of a command from the key input section 29, the control circuit 27 controls the hard disk 30 or video/audio decoding section 28 to execute recording/playback control, a service, or the like or imposes a limitation on the execution in accordance with the content of the determination output signal.

As described above, according to this embodiment, with the concrete arrangements for recording/playback with respect to the hard disk 30 and playback control on the video/audio decoding section 28, the same effects as those of the first embodiment can be obtained in a concrete form.

THIRD EMBODIMENT

Figure 4:
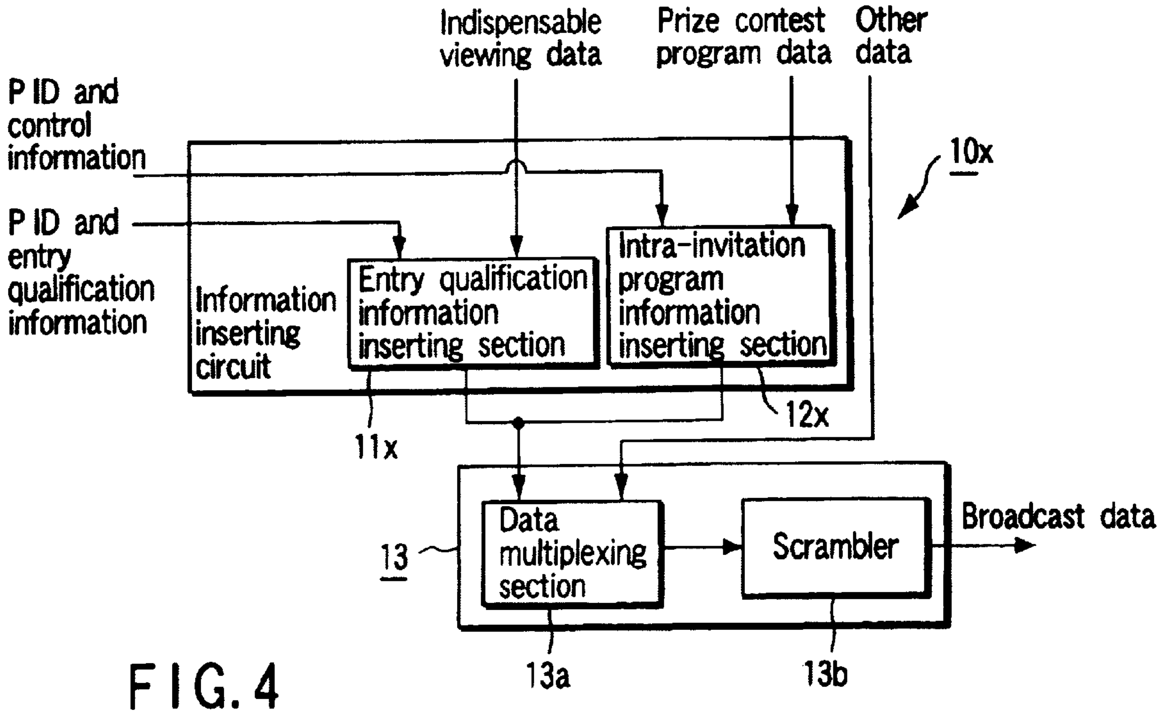
FIG. 4 is a schematic view showing the arrangement of a broadcasting station applied to a broadcasting system according to the third embodiment of the present invention.
Figure 5:
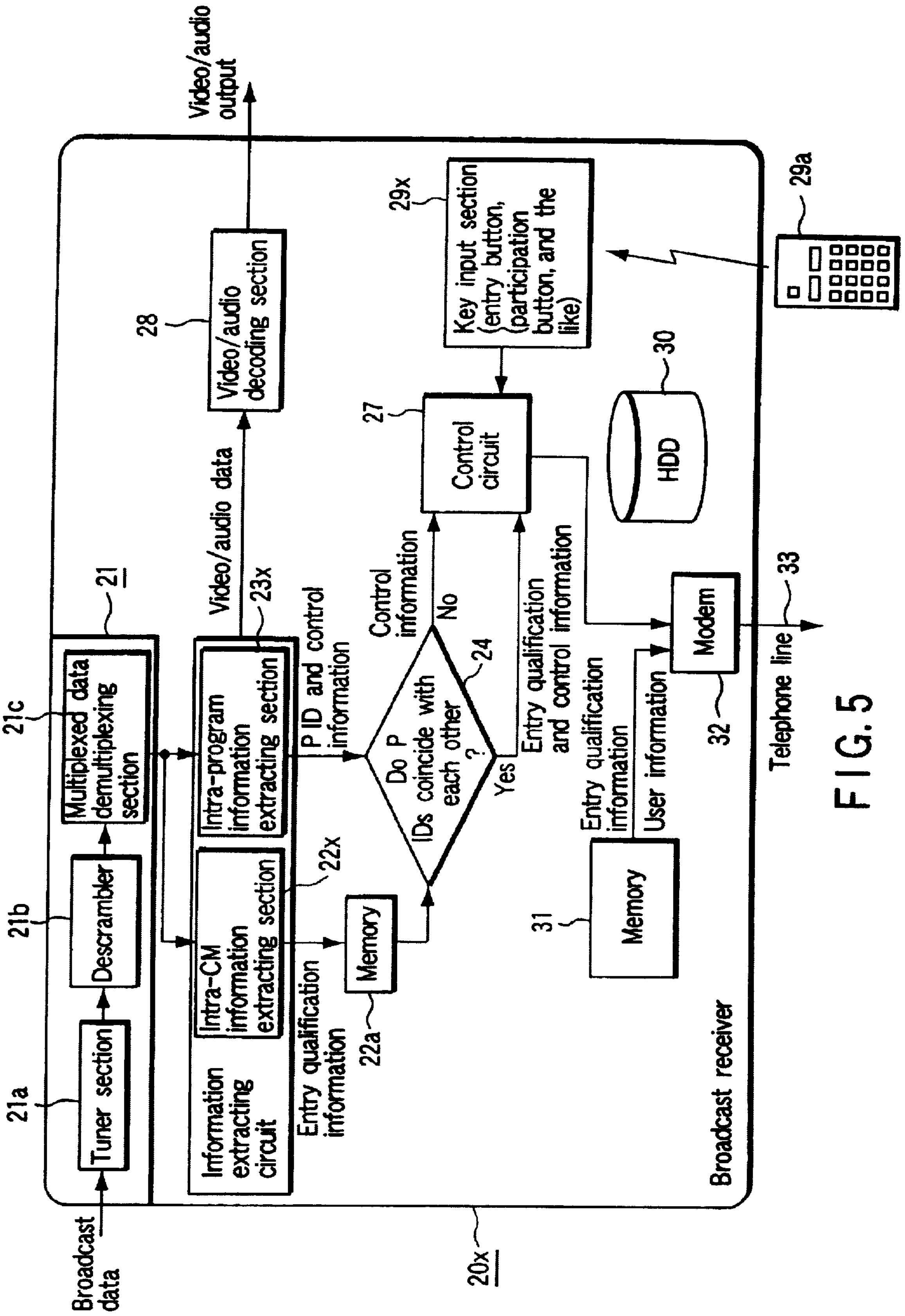
FIG. 5 is a schematic view showing the arrangement of a broadcast receiver in the third embodiment.

FIG. 4 is a schematic view showing the arrangement of a broadcasting station applied to a broadcasting system according to the third embodiment of the present invention. FIG. 5 is a schematic view showing the arrangement of a broadcast receiver applied to this system.

This embodiment is a modification of the second embodiment, and configured to give an entry qualification to a viewer who has viewed a necessary portion and allow he/her to enter and/or participate in a prize contest program.

In this case, as shown in FIG. 4, a broadcasting station 10x uses indispensable viewing data in place of CM data, and a P ID (identification number of indispensable viewing data) in place of a CM ID.

Likewise, the broadcasting station 10x uses entry qualification information in place of the control information 1 , and control information in place of the control information 2.

In addition, the broadcasting station 10x uses a entry qualification information inserting section 11x in place of the intra-CM information inserting section 11, and an intra-invitation program information inserting section 12x in place of the intra-program information inserting section 12.

In this case, indispensable viewing data is data serving as a prize entry requirement which is broadcast in a prize contest program. For example, as such data, various data such as data in a specific period of time in a program and a CM of a prize providing company which is inserted midway in a program can be used.

Entry qualification information is information indicating that the viewer has an entry qualification. For example, such a viewer can use a password or the like required for an entry.

Control information is information associated with entry processing, e.g., information for specifying of indispensable viewing data(P ID), an entry qualification associated with entry limitation imposed in the absence of the specified indispensable viewing data, an entry method including an entry period and a modem connection destination and the like independent of the presence/absence of specified indispensable viewing data, and the like.

As shown in FIG. 5, in accordance with the above replacement, a broadcast receiver section 20x uses an entry qualification information extraction section 22x in place of the intra-CM information extracting section 22, and an intra-invitation program information extracting section 23x in place of the intra-program information extracting section 23.

A key input section 29x includes, in addition to the above functions, an entry or participation button for inputting an entry or participation command to a control circuit 27.

The broadcast receiver section 20x also has a memory 31 and modem 32.

User information such as contract information is registered in the memory 31.

The modem 32 is a device for outputting the entry qualification information received from the control circuit 27 and the user information obtained from the memory 31 to a telephone line 33 under the control of the control circuit 27 when the viewer is to receive a service of entering or participating in a prize contest.

Note that the control circuit 27 can impose various limitations depending on prizes, e.g., "inhibiting entry" and "imposing limitation on prize for which entry is permitted".

If the viewer has already held the P ID that coincides with the P ID extracted from the prize contest program data, he/she can make an entry for the prize contest by using a means (e.g., a modem connection destination for the entry) set for each prize under the control of the control circuit 27 on the basis of the entry qualification information and control information.

With the above arrangement, since the second embodiment is applied to an entry or participation in a prize contest program, the same effects as those of the second embodiment can be obtained concerning a prize contest program.

The techniques described in the respective embodiments can be distributed as programs that can be executed by a computer after being stored in a storage medium such as a magnetic disk (e.g., a floppy (registered trademark) disk or hard disk), an optical disk (e.g., a CD-ROM or DVD), a magnetooptical disk (MO), or a semiconductor memory.

As this storage medium, a storage medium in any storage form can be used, as long as it is a computer-readable storage medium.

In addition, an OS (Operating System) that operates on a computer on the basis of instructions of a program installed from a storage medium into the computer, MW (middleware) such as database management software or network software, and the like may execute part of each process for implementing each embodiment.

Furthermore, the storage medium in the present invention is not limited to a medium independent of a computer, and includes a storage medium in which a program transmitted from a LAN, the Internet, or the like is downloaded and stored or temporarily stored.

Moreover, the storage medium is not limited to one medium. Even when processing in each embodiment is executed by using a plurality of media, they are incorporated in the storage medium in the present invention. Any medium arrangement can be used.

Note that the computer in the present invention executes each process in each embodiment on the basis of a program stored in the storage medium, and may take any arrangement, including a single apparatus formed from one personal computer, a system in which a plurality of apparatuses are connected to each other through a network, and the like.

In addition, the computer in the present invention is not limited to a personal computer and is a generic term for devices and apparatuses which can implement the functions of the present invention by using programs, including processors, microcomputers, and the like included in information processing equipment.

Note that the present invention is not limited to the respective embodiments described above, and can be variously modified in the execution phase without departing from the spirit and scope of the invention. For example, the digital broadcasting system in each embodiment is arbitrary, and can be terrestrial broadcasting, satellite broadcasting, and Internet streaming broadcasting. In addition, the present invention can be practiced in possible combinations of the respective embodiments. In this case, the respective combinations produce some effects. In the present invention, the embodiments include inventions in various stages, and various inventions can be extracted by proper combinations of a plurality of disclosed constituent elements. Assume that an invention is extracted if several constituent elements are omitted from the all the constituent elements described in an embodiment. In this case, when the extracted invention is to be practiced, the omitted portions are properly compensated for by known conventional techniques.

The present invention can be variously modified and practiced without departing from the spirit or scope of the invention.

What is claimed is:

1. A broadcasting system comprising:

a broadcasting apparatus which sequentially transmits commercial data containing first control information and commercial ID, and program data containing second control information and commercial ID over the same channel; and a receiving apparatus which executes, upon sequential loading of the commercial data and the program data, processing based on the first control information and second control information on the basis of an input command;

wherein the receiving apparatus includes:

a receiving device configured to receive the commercial data and program data transmitted from the broadcasting apparatus;

a first extracting device configured to extract the commercial ID and the first control information from the commercial data received by the receiving device and holding the commercial ID and the first control information:

a second extracting device configured to extract the commercial ID and the second information from the program data received by the receiving device and holding the commercial ID and the second information while sending out the commercial ID;

a comparing device configured to compare the commercial ID received from the second extracting device with the commercial ID held in the first extracting device and determining whether they coincide with each other; sending out a first determination output signal when the determination result indicates that they do not coincide with each other or the first extracting device holds no commercial ID; and sending out a second determination output signal when the determination result indicates that they coincide with each other;

a permission device configured to permit, upon reception of the second determination output signal, recording/playback control operations and services set for the respective program data on the basis of the first and second control information held in the respective extracting device; and a limiting device configured to limit, upon reception of the first determination output signal, recording/playback of the digital broadcast and services on the basis of the second control information held in the second extracting device;

wherein the first control information contains program recording control information, playback control information after recording, and participation right control information in the case of a viewer participation program; and the second control information contains information used for program viewing/recording control while no commercial data is received and the first control information.

2. The broadcasting system according to claim 1, wherein the first control information and second control information are respectively embedded in the commercial data and the program data by a digital watermark.

3. A broadcasting apparatus comprising:

a first inserting device configured to insert first control information in commercial data to control processing by a receiving apparatus;

a second inserting device for inserting second control information in program data to control processing by the receiving apparatus; and transmitting device configured to transmit sequentially the commercial data in which the first control information is inserted and the program data in which the second control information is inserted over the same channel;

wherein the first control information contains program recording control information, playback control information after recording, and participation right control information in the case of a viewer participation program; and the second control information contains information used for program viewing/recording control when no commercial data is received and the first control information.

4. The broadcasting apparatus according to claim 3, wherein the first inserting device embeds the first control information in the commercial data by a digital watermark, and the second inserting device embeds the second control information in the program data by a digital watermark.

5. A receiving apparatus comprising:

a receiving device configured to receive sequentially commercial data containing first control information and commercial ID, and program data containing second control information and commercial ID over the same channel;

an execution device configured to, upon sequential loading of the received commercial data and the program data, execute processing based on the first control information and second control information on the basis of an input command;

a first extracting device configured to extract the commercial ID and the first control information from the commercial data received by the receiving device and holding the commercial ID and the first control information;

a second extracting device configured to extract the: commercial ID and the second information from the program data received by the receiving device and holding the commercial ID and the second information while sending out the commercial ID;

a comparing device configured to compare the commercial ID received from the second extracting device with the commercial ID held in the first extracting device and determining whether they coincide with each other; sending out a first determination output signal when the determination result indicates that they do not coincide with each other or the first extracting device holds no commercial ID; and sending out a second determination output signal when the determination result indicates that they coincide with each other;

a permission device configured to permit, upon reception of the second determination output signal, recording/playback control operations and services set for the respective program data on the basis of the first and second control information held in the respective first and second extracting means; and a limiting device configured to limit, upon reception of the first determination output signal, recording/playback of the digital broadcast and services on the basis of the second control information held in the second extracting device;

wherein the first control information contains program recording control information, playback control information after recording, and participation right control information in the case of a viewer participation program; and the second control information contains information used for program viewing/recording control while no commercial data is received and the first control information.

6. The receiving apparatus according to claim 5, wherein the first control information and second control information are respectively embedded in the commercial data and the program data by a digital watermark.

7. The receiving apparatus according to claim 5, wherein the execution device executes recording processing and playback processing of the program data on the basis of the input command, the first control information, and the second control information.

8. A method for broadcasting in a broadcasting system including a broadcasting apparatus which sequentially transmits commercial data containing first control information and commercial ID, and program data containing second control information and commercial ID over the same channel; and a receiving apparatus which executes, upon sequential loading of the commercial data and the program data, processing based on the first control information and second control information on the basis of an input command;

the method comprising:

receiving the commercial data and program data transmitted from the broadcasting apparatus;

extracting the commercial ID and the first control information from the commercial data received by the receiving apparatus and holding the commercial ID and the first control information;

extracting the commercial ID and the second information from the program data received by the receiving apparatus and holding the commercial ID and the second information while sending out the commercial ID;

comparing the commercial ID extracted from the program data with the commercial ID held and determining whether they coincide with each other; sending out a first determination output signal when the determination result indicates that they do not coincide with each other or holds no commercial ID; and sending out a second determination output signal when the determination result indicates that they coincide with each other;

permitting, upon reception of the second determination output signal, recording/playback control operations and services set for the respective program data on the basis of the first and second control information held; and limiting, upon reception of the first determination output signal, recording/playback of the digital broadcast and services on the basis of the second control information held;

wherein the first control information contains program recording control information, playback control information after recording, and participation right control information in the case of a viewer participation program; and the second control information contains information used for program viewing/recording control while no commercial data is received and the first control information.

9. The method according to claim 8, wherein the first control information and second control information are respectively embedded in the commercial data and the program data by a digital watermark.

10. A method for broadcasting in a broadcasting apparatus, the method comprising:

inserting first control information in commercial data to control processing by a receiving apparatus;

inserting second control information in program data to control processing by the receiving apparatus; and sequentially transmitting the commercial data in which the first control information is inserted and the program data in which the second control information is inserted over the same channel;

wherein the first control information contains program recording control information, playback control information after recording, and participation right control information in the case of a viewer participation program; and the second control information contains information used for program viewing/recording control while no commercial data is received and the first control information.

11. The method according to claim 10, wherein inserting the first control information comprises embedding the first control information in the commercial data by a digital watermark, and inserting the second control information comprises embedding the second control information in the program data by a digital watermark.

12. A method for receiving in a receiving apparatus, the method comprising:

sequentially receiving commercial data containing first control information and commercial ID, and program data containing second control information and commercial ID over the same channel;

executing processing based on the first control information and second control information on the basis of an input command, upon sequential loading of the received commercial data and the program data;

extracting the commercial ID and the first control information from the commercial data received and holding the commercial ID and the first control information;

extracting the commercial ID and the second information from the program data received and holding the commercial ID and the second information while sending out the commercial ID;

comparing the commercial ID extracted from the program data with the commercial ID held and determining whether they coincide with each other; sending out a first determination output signal when the determination result indicates that they do not coincide with each other or holds no commercial ID; and sending out a second determination output signal when the determination result indicates that they coincide with each other;

permitting, upon reception of the second determination output signal, recording/playback control operations and services set for the respective program data on the basis of the first and second control information held; and limiting, upon reception of the first determination output signal, recording/playback of the digital broadcast and services on the basis of the second control information held;

wherein the first control information contains program recording control information, playback control information after recording, and participation right control information in the case of a viewer participation program; and the second control information contains information used for program viewing/recording control while no commercial data is received and the first control information.

13. The method according to claim 12, wherein the first control information and second control information are respectively embedded in the commercial data and the program data by a digital watermark.

14. The method according to claim 12, wherein executing the processing comprises executing recording processing and playback processing of the program data on the basis of the input command, the first control information, and the second control information.

* * * * *